(12) United States Patent
Schlüter

(10) Patent No.: US 7,357,466 B2
(45) Date of Patent: Apr. 15, 2008

(54) BRAKING FORCE GENERATOR FOR A HYDRAULIC VEHICLE BRAKE SYSTEM

(75) Inventor: Peter Schlüter, Kammerforst (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/503,741

(22) Filed: Aug. 14, 2006

(65) Prior Publication Data

US 2006/0273659 A1 Dec. 7, 2006

Related U.S. Application Data

(63) Continuation of application No. PCT/EP2005/001325, filed on Feb. 10, 2005.

(30) Foreign Application Priority Data

Feb. 17, 2004 (DE) ............. 10 2004 007 659

(51) Int. Cl.
*B60T 8/44* (2006.01)

(52) U.S. Cl. ............... 303/114.1; 303/113.3; 92/5 R

(58) Field of Classification Search ............ 303/113.1, 303/113.3, 114.1, 114.3, 115.1, 87, 20, 10, 303/4; 91/361, 367, 368, 374, 376 R, 385, 91/369.1; 92/5 R; 338/50, 103, 108, 116, 338/162, 196
See application file for complete search history.

(56) References Cited

U.S. PATENT DOCUMENTS

| 3,592,514 | A | * | 7/1971 | De Hoff | ............ 303/115.3 |
| 5,224,410 | A | * | 7/1993 | Graichen et al. | ............ 91/1 |
| 5,493,946 | A | | 2/1996 | Schlüter | |
| 5,711,204 | A | * | 1/1998 | Michels | ............ 303/114.3 |
| 6,253,656 | B1 | * | 7/2001 | Gilles | ............ 91/367 |
| 6,494,546 | B1 | | 12/2002 | Feigel | |

FOREIGN PATENT DOCUMENTS

| DE | 40 03 957 A1 | 8/1991 |
| DE | 44 05 092 C1 | 12/1994 |
| DE | 196 19 954 A1 | 11/1997 |
| DE | 196 44 555 A1 | 4/1998 |
| DE | 197 29 158 C1 | 10/1998 |
| DE | 198 22 545 A1 | 5/1999 |
| DE | WO-99/59855 A1 * | 11/1999 |
| DE | WO-00/43246 A1 * | 7/2000 |
| WO | WO 99/52756 | 10/1999 |

* cited by examiner

*Primary Examiner*—Pam Rodriguez
(74) *Attorney, Agent, or Firm*—MacMillan, Sobanski & Todd, LLC

(57) ABSTRACT

In a brake force generator for a vehicle hydraulic brake system having a force input element, which is connectable or connected to a brake pedal and displaceable in a base housing of the brake force generator, a master cylinder, in which a primary piston is displaceably guided, wherein the primary piston with the master cylinder delimits a primary pressure chamber for generating a hydraulic brake pressure, an electromagnetic actuating force generating device for exerting an actuating force on the primary piston, and at least one operating position detecting device for detecting the present operating position of the brake force generator, it is provided that the actuating force generating device is controllable in accordance with a brake pedal actuation and that the brake force generator is provided with a central connector, in which contact elements for contacting electric lines to the actuating force generating device and to the operating position detecting device are integrally provided.

21 Claims, 8 Drawing Sheets

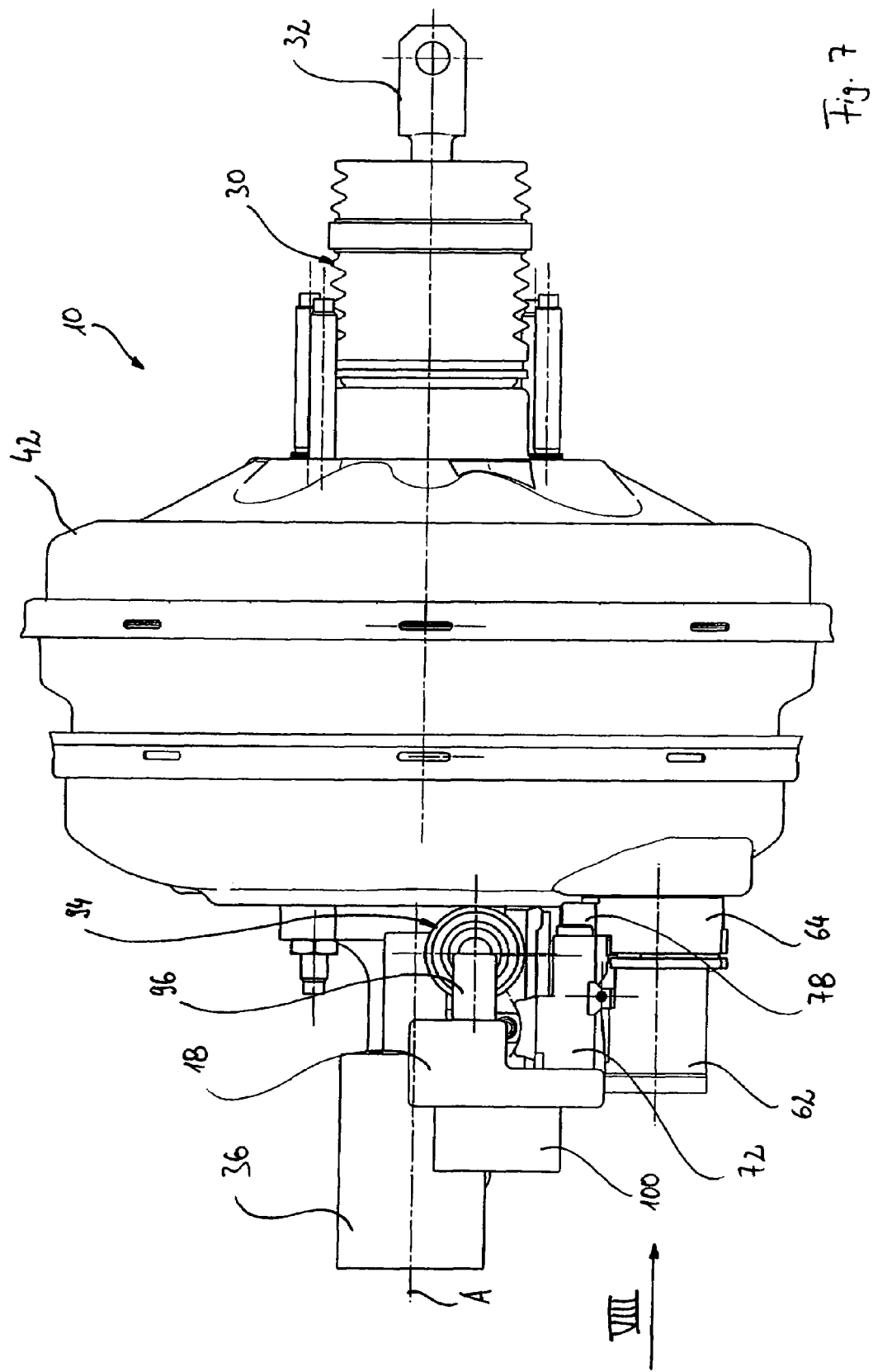

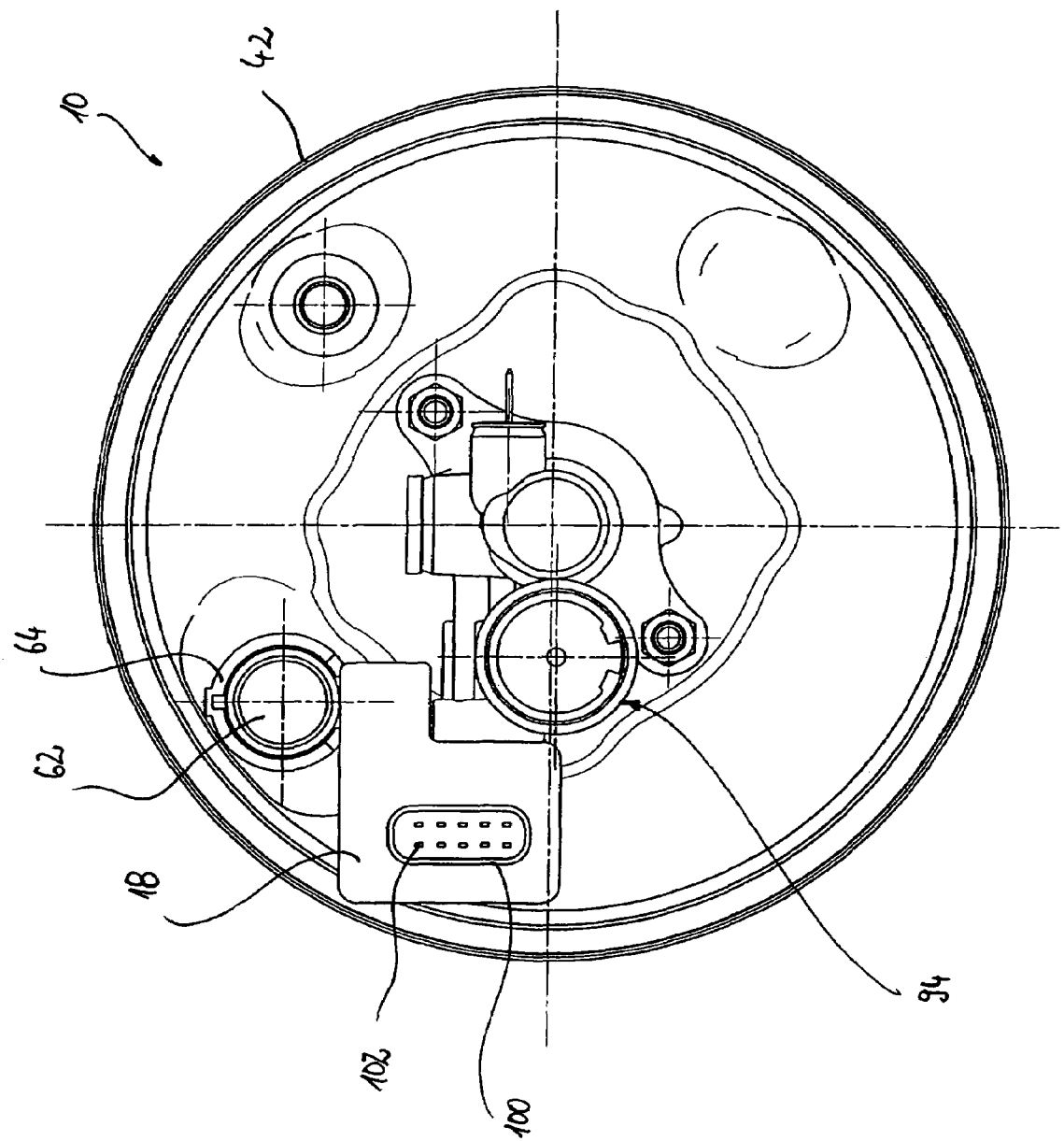

BRAKING FORCE GENERATOR FOR A HYDRAULIC VEHICLE BRAKE SYSTEM

CROSS-REFERENCE TO RELATED APPLICATIONS

This application is a continuation of International Application No. PCT/EP2005/001325 filed Feb. 10, 2005, the disclosures of which are incorporated herein by reference, and which claimed priority to German Patent Application No. 10 2004 007 659.6 filed Feb. 17, 2004, the disclosures of which are incorporated herein by reference.

BACKGROUND OF THE INVENTION

The present invention relates to a brake force generator for a vehicle hydraulic brake system having a force input element, which is connectable or connected to a brake pedal and displaceable in a base housing of the brake force generator, a master cylinder, in which a primary piston is displaceably guided, wherein the primary piston with the master cylinder delimits a primary pressure chamber for generating a hydraulic brake pressure, an electromagnetic actuating force generating device for exerting an actuating force on the primary piston, and at least one operating position detecting device for detecting the present operating position of the brake force generator, wherein the actuating force generating device is controllable in accordance with a brake pedal actuation.

In currently conventional brake systems, the hydraulic brake pressure required for acting upon the wheel brake of the vehicle is generated predominantly by means of a master cylinder. For this purpose, it is necessary to initiate an actuating force upon the said master cylinder that is generated in response to an actuation of the brake pedal by the vehicle driver. For improved actuating comfort, the actual brake pedal force is usually increased by a predetermined percentage by means of a brake booster so that the necessary brake pedal actuating forces for a desired vehicle deceleration may be kept low enough to allow each driver to brake the vehicle adequately without exertion.

Such a brake system with a brake booster is known for example from DE 44 05 092, and corresponding U.S. Pat. No. 5,493,946, both of which are incorporated herein by reference. The brake booster according to this background art is constructed with an electromagnetic auxiliary control device comprising a controllable electromagnet, by means of which a magnetic armature may be displaced in order to generate a brake force. For control of the electromagnetic auxiliary control device, it is necessary to run lines to the electromagnet. Lines moreover have to be run to various sensors, by means of which the operating state of the brake booster may be determined. These lines have to be connected to a higher-level control unit. In practice, this entails a considerable cabling outlay, wherein a large number of different electrical plug-in connectors are used, which are disposed at various points of the brake booster.

With these brake systems, it has meanwhile begun to be regarded as a drawback that the driver by virtue of his actuating action at the brake pedal always influences the hydraulic pressure at the wheel brakes. So long as the action of the driver assists the braking situation, this is not a problem. However, as soon as the driver reacts incorrectly to the actual braking situation, for example by adjusting too much or too little brake pressure, the braking performance, in particular the braking distance and the stability of the vehicle may be adversely affected, which in the worst-case scenario may lead to an accident.

Modern vehicle control systems (ABS, ESP, TC etc.) are now able to determine from the instantaneous driving state of the vehicle the optimum braking power requirement within the physical limits and hence to optimize a braking operation. A prerequisite of this is, however, to prevent the previously mentioned direct influence of the driver on the brake pressure. Furthermore, it has meanwhile also begun to be regarded as unacceptable that the driver senses the action of the vehicle control system at the brake pedal, for example a repeated shaking at the brake pedal upon activation of the ABS.

In order to meet these requirements associated with vehicle control systems, in modern brake systems the brake pedal is already uncoupled from the brake force generation, in which case the brake pedal actuation is used merely to communicate the deceleration request of the driver. The actual brake force generation, for example for actuating the master cylinder, is then effected by means of a separate brake force generating device, namely solely on the basis of control data of an electronic control unit. It is therefore possible to check in advance whether or not, for example, the desired vehicle deceleration would exceed the instantaneously effective physical limits in respect of braking distance and vehicle stability that are determined by the vehicle control systems (ABS, ESP, TC etc.). At the same time, the control unit may of course also compensate an inadequate deceleration adjusted by the driver in order to minimize the stopping distance in emergency situations through adjustment of a higher brake pressure.

Such a system is described for example in the background art according to EP 1 070 006, and corresponding U.S. Pat. No. 6,494,546, both of which are incorporated herein by reference. It has however emerged that such brake systems are relatively cost-intensive to manufacture and entail a considerable equipment outlay in order to guarantee reliable brake operation also in the event of failure of the brake force generating means. In this background art also, a large number of sensors have to be provided for monitoring the present operating state of the brake force generating device and are connected to a higher-level control device for signal transfer. This leads to the drawbacks already outlined above, namely a high cabling outlay and a large number of plug-in connectors to be contacted.

BRIEF SUMMARY OF THE INVENTION

The present invention generally provides a brake force generator of the initially described type that guarantees easily installable, economical cabling as well as reliable operation.

This may be achieved by a brake force generator having the initially described features in that the brake force generator is provided with an electric central connector, in which contact elements for contacting electric lines to the actuating force generating device and to the operating position detecting device are integrally provided.

By virtue of the invention it is generally possible to keep the cabling outlay of the brake force generator low by providing the central connector, wherein the central connector has all of the contact elements needed for control of the brake force generator. Thus, when the brake force generator is assembled, for control thereof the central connector merely has to be connected to the vehicle electronics. The cabling outlay may therefore be kept relatively low. In particular, this avoids the need to contact a large number of different electric connectors at various points of the brake force generator.

It should be pointed out that, in the context of this invention description, the term "brake force generator" may be related both to a device, which like a brake booster merely intensifies the actuating force exerted via the brake pedal, and to a device, in which the actuating force exerted via the brake pedal remains largely unused and the brake force is generated substantially entirely by the brake force generator in accordance with the pedal actuating force. The principle according to the invention is applicable to both types of device.

A development of the invention generally provides that the brake force generator comprises a control valve, a chamber arrangement and an electromagnetic actuator, wherein the chamber arrangement is designed with a vacuum chamber and a working chamber, which is separated from the vacuum chamber by a movable wall and fluidically connectable to the vacuum chamber by the control valve, and wherein the operating position detecting device, in particular in the form of a position sensor, is designed to detect the present position of the movable wall.

In this connection, it may further be provided that the chamber arrangement is designed as a tandem chamber arrangement comprising a first chamber arrangement and a second chamber arrangement separated from the first, wherein the first chamber arrangement comprises a first vacuum chamber and a first working chamber separated from the first vacuum chamber by a first movable wall, wherein moreover the second chamber arrangement comprises a second vacuum chamber and a second working chamber separated from the second vacuum chamber by a second movable wall, wherein the first and second chamber arrangement may be pressurized by means of the control valve.

The actuator situated inside the chamber arrangement is preferably electrically controlled. For this purpose, electric lines are extended through the chamber arrangement. In said case, it may be provided that the electric lines from the actuator to the central connector are run through a guide element, in particular a guide tube, which penetrates at least one part of the chamber arrangement. Preferably, the guide element, in particular the guide tube, or the components of the brake force generator that interact therewith are provided at the contact points with seals in order to prevent impairment of the function of the chamber arrangement.

To prevent the individual movements of various components of the brake force generator according to the invention from being impeded by the cabling, a development of the invention provides that the electric lines from the actuator to the central connector extend spirally or helically at least in one part of the chamber arrangement. The lines may therefore compensate movements of individual components.

The brake force generator is preferably designed with a pedal actuation detecting device, in particular with an angle-of-rotation sensor disposed at an axis of rotation of the brake pedal, for detecting an actual deflection of the brake pedal. On the basis of the detected pedal actuation, the brake force generator may then be controlled.

The brake force generator may further comprise a pedal counterforce simulating device that is connectable or connected to the force input element. In this connection, in a development of the invention it may be provided that the pedal counterforce simulating device is designed with a pedal counterforce hydraulic system, wherein the pedal counterforce hydraulic system is provided with an electrically controllable block valve, which in a first position, preferably its passive position, uncouples the pedal counterforce hydraulic system and the force input element hydraulically from one another and allows a substantially undamped movement of the force input element and which in a second position, preferably its active position, connects the pedal counterforce hydraulic system and the force input element hydraulically to one another.

Also with regard to the inclusion of these components in the vehicle electronics, it may be provided that electrical contact elements for contacting electric lines to the pedal actuation detecting device or/and to the block valve are integrated in the central connector or in an auxiliary connector disposed in spatial proximity to the central connector.

For controlling the brake force generator, an electronic control device is preferably provided, which controls the actuating force generating device in accordance with an output signal of the operating position detecting device. In this connection, a development of the invention provides that the electronic control device is electrically connected to the pedal actuation detecting device or/and the block valve.

With regard to the control device, a particularly space-saving arrangement and easy assembly is achieved when the control device is mechanically fitted directly on, and electrically connected to, the central connector and optionally the at least one auxiliary connector.

Furthermore, installation space may be saved also in that the central connector is formed integrally with the operating position detecting device. This may be achieved for example by integrating the central connector in the housing of the operating position detecting device. A further advantage of this form of construction according to the invention is that it allows a reduction of the number of parts to be assembled.

Assembly is further facilitated when the central connector is connected or connectable to a terminal connector for contacting electric lines to the actuating force generating device. In this connection, according to the invention it may also be provided that the terminal connector is constructed integrally with a receiving element, wherein the receiving element fastens the operating position detecting device to the base housing. It is therefore possible first to mount the receiving element on the base housing and then fit the operating position detecting device, which is constructed integrally with the central connector, on the receiving element. The control device may then be plugged onto the central connector and at the same time also optionally connected to the auxiliary connector. The result is a compact, space-saving and easy-to-assemble arrangement. Preferably, it is also provided that the central connector and optionally the auxiliary connector are fastened or fastenable to the base housing.

The invention further relates to a brake system for a vehicle having a brake force generator of the previously described type. The brake force generator is installed in a conventional manner between a brake pedal and the further hydraulic brake system in an arrangement such as is already known as such from the background art.

Other advantages of this invention will become apparent to those skilled in the art from the following detailed description of the preferred embodiments, when read in light of the accompanying drawings.

BRIEF DESCRIPTION OF THE DRAWINGS

FIG. 7 a view as in FIG. 6, but with the brake force generator rotated through a further 90° and with a mounted control device and FIG. 8 a view in the direction according to arrow VIII of FIG. 7.

DETAILED DESCRIPTION OF THE INVENTION

Figure 1:
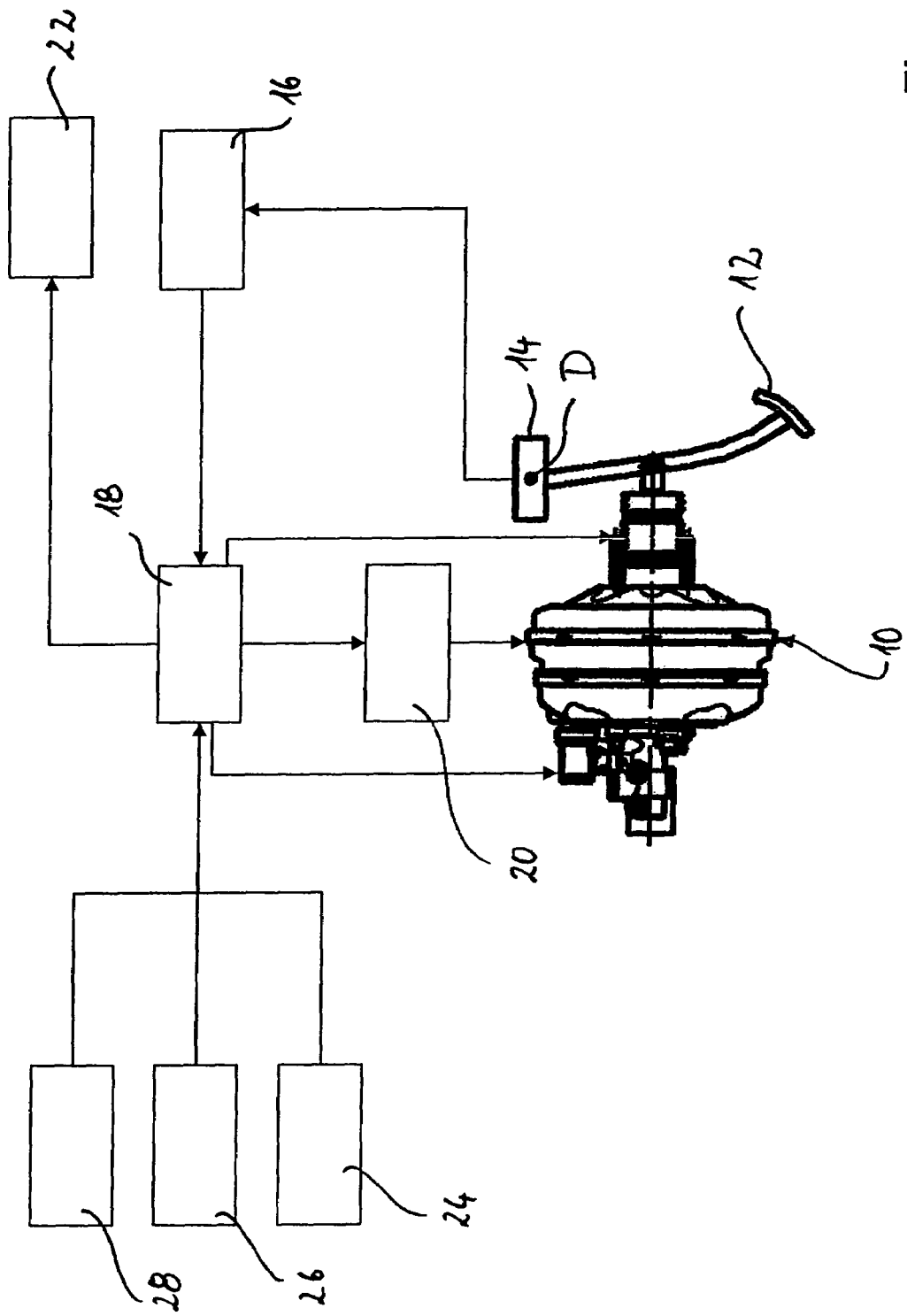
FIG. 1 a diagrammatic overview representation of the brake force generator according to the invention and of the vehicle components connected thereto.

In FIG. 1 a brake force generator according to the invention is generally denoted by 10 and shown in a diagrammatic overview representation. The brake force generator 10 is connected to a brake pedal 12. A pedal actuation is detected by an angle-of-rotation sensor 14 disposed around an axis of rotation D and is communicated to an angle-of-rotation sensor evaluation device 16. This communicates to an electronic control unit 18 a signal corresponding to the actual pedal actuation. In accordance with the signal characterizing the actual pedal actuation, the electronic control unit 18 activates a vacuum pump 20 as well as further components of the brake force generator 10, as will be additionally explained below. The electronic control unit 18 moreover activates a brake light 22 in response to a detected pedal actuation. The electronic control unit 18 further receives signals from various control systems within the vehicle, such as for example an electronic stability program 24, an antilock braking system 26, an automatic collision avoidance system (cruise control) 28 or the like. The signals flowing from these programs to the electronic control unit 18 are evaluated and used to control the brake force generator according to the invention.

Figure 2:
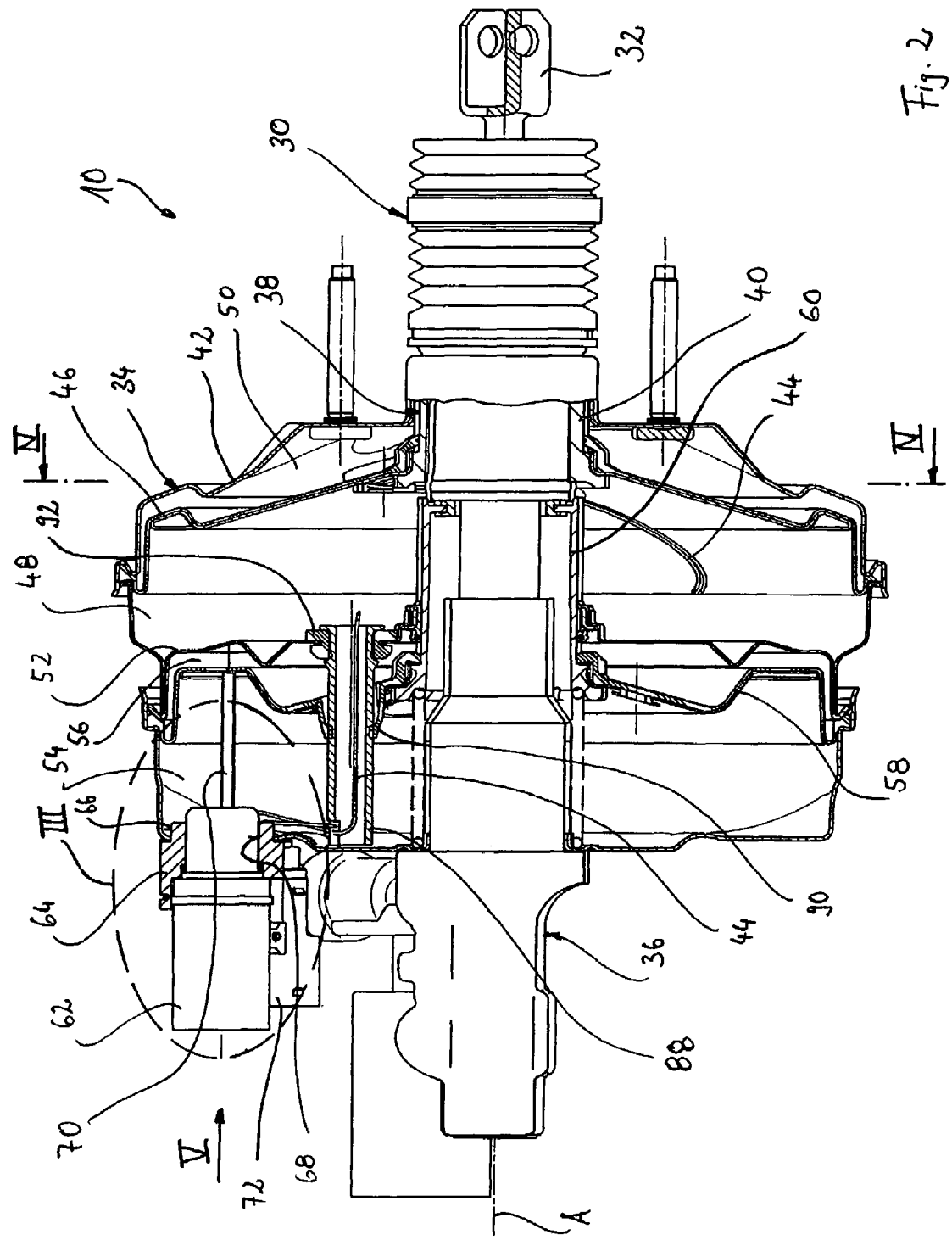
FIG. 2 an enlarged, part-sectional side view of the brake force generator according to the invention.

In FIG. 2 the brake force generator 10 according to the invention is represented in a part-sectional side view. It comprises an actuating unit 30, into which a force input element 32 is introduced. The force input element 32 at its free end is connectable to a brake pedal, which is not shown in FIG. 2. The actuating unit 30 is connected to a chamber arrangement 34. At the side of the chamber arrangement 34 remote from the actuating unit 30 it is possible to see part of a cylinder housing 36 of the master cylinder.

For a detailed description of the construction of the brake force generator 10 according to the invention, reference is to be made in the following also to FIGS. 3 to 8. Running into the, in FIG. 2, righthand part of the brake force generator 10 is the force input element 32, which is of a rod-shaped design. In this region a control valve 38 is provided. The control valve 38 comprises a control valve housing 40, which is displaceable relative to a base housing 42 of the brake force generator 10. The control valve 38 is actuable electromechanically and may be controlled via lines 44. For a detailed description of the function of the control valve 38, reference is made to the description of the patent application having the official file number DE 10 2004 005 107.

The control valve housing 40 is connected in a fixed manner to a first movable wall 46 disposed in the base housing 42. The first movable wall 46 subdivides the, in FIG. 3, righthand part of the chamber arrangement 34 into a vacuum chamber 48 and a working chamber 50. The vacuum chamber 48 is separated from the, in FIG. 2, lefthand part of the chamber arrangement 34 by a rigid wall 52 fixed in the housing 42. This part of the chamber arrangement 34 likewise comprises a vacuum chamber 54 and a working chamber 56, which are separated from one another by a second movable wall 58. The first movable wall 46 and the second movable wall 58 are rigidly connected to one another for the purpose of joint movement. For this purpose, the second movable wall 58 is fastened on a coupling sleeve 60, which is connected in a fixed manner to the control valve housing 40.

In the control valve housing 40 an electrically controllable coil of an electromagnetic actuator is disposed. The actuator further comprises a magnetic armature, which is displaceable relative to the control valve housing 40 and to the coil in the direction of the longitudinal axis A of the brake force generator 10. The armature is coupled for a joint movement in axial direction to the valve sleeve 40.

In the state shown in FIG. 2, the control valve 38 connects in each case the vacuum chamber 48 to the working chamber 50 and the vacuum chamber 54 to the working chamber 56. The vacuum chambers 48 and 54 are in said case connected to a non-illustrated vacuum source, for example to the intake tract of an internal combustion engine of a vehicle equipped with the brake force generator 10 or to a separately designed vacuum pump 20. The force input element 32 is biased into the position shown in FIG. 2 by means of a resetting spring.

FIG. 2 further shows that a position sensor 62 is provided in the base housing 42. The position sensor 62 is connected by a retaining element 64 to the base housing 42, wherein the retaining element is designed with an outer retaining seat 66, by which it is inserted sealingly into the base housing 42. The retaining element 64 further comprises an inner retaining seat 68, with which it receives a shank of the position sensor 62. The position sensor 62 comprises a feeler 70, which presses in a spring-biased manner against the movable wall 58 and is moved simultaneously therewith, so that the present position of the feeler 70 that is detectable by means of the position sensor 62 provides information about the present position of the movable wall 58.

Figure 3:
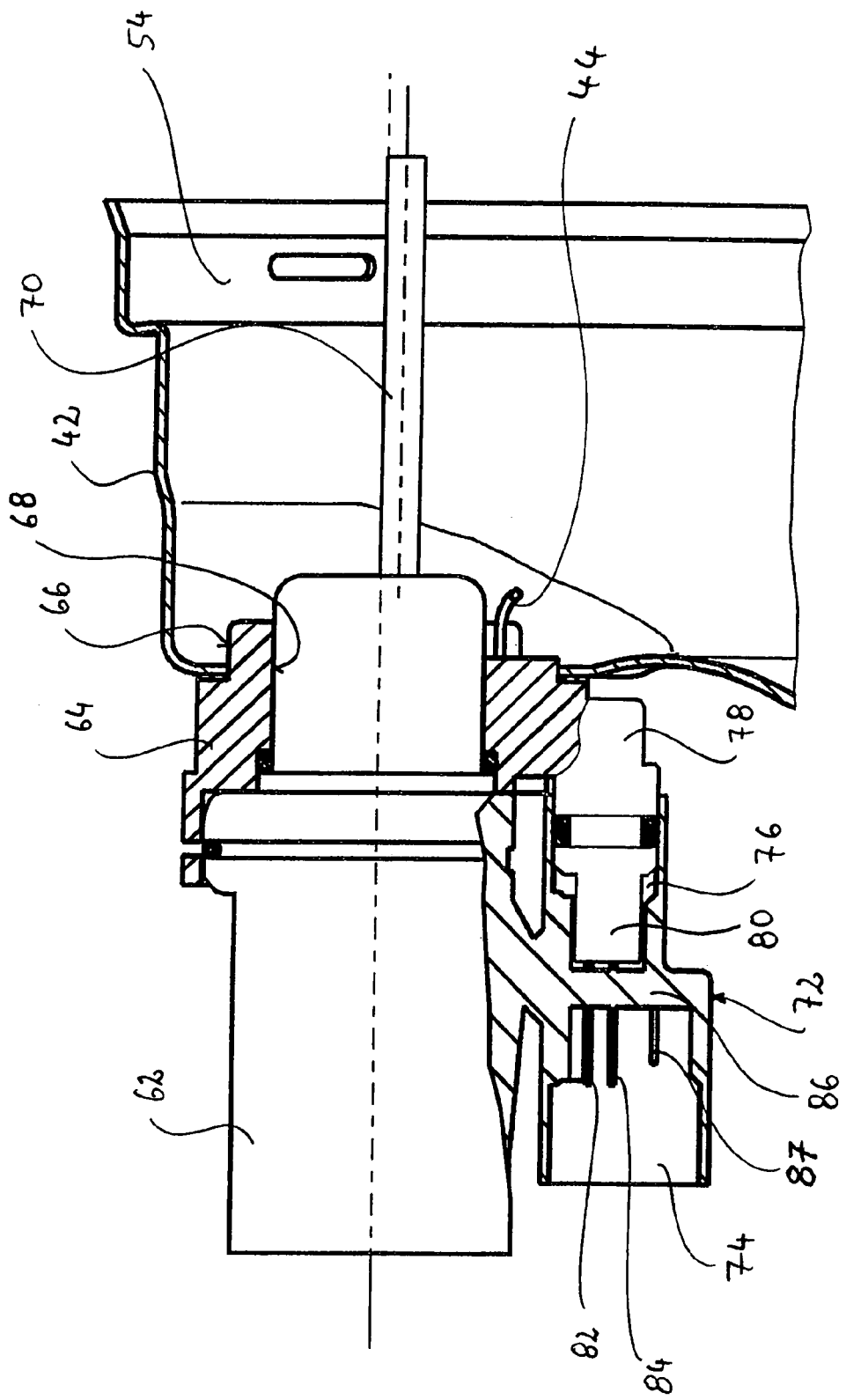
FIG. 3 an enlarged part-sectional view of the region denoted by III in FIG. 2.

FIG. 3 is an enlarged view of the region denoted by III in FIG. 2. From FIG. 3 it is evident that on the position sensor 62 an extension 72 is provided, which is designed in the form of a plug socket. The extension 72 has an opening 74 facing in FIG. 3 to the left and an opening 76 facing in FIG. 3 to the right. The two openings 74 and 76 are separated from one another by a dividing wall 86. Both openings 74 and 76 are designed in the form of plug sockets. FIG. 3 further shows one of the lines 44 that run through the chamber arrangement according to FIG. 2.

The retaining element 64 is likewise designed with an extension 78, which at its free end 80 is designed in the form of a plug-in connector. Provided therein are non-illustrated contact elements for transmitting the signals emitted by the position sensor 62. To bring about the state shown in FIG. 3, first the retaining element 64 is inserted into the base housing 42. Then the position sensor 62 is plugged into the inner retaining seat 68 and accommodated there in a sealing manner by sealing elements, wherein the extension 72 receives the free end 80 of the extension 78. In said case, contact pins 82 and 84 engage into, and are connected conductively to, the contact elements inside the free end 80. The contact pins 82 and 84 extend through the dividing wall 86 that separates the two openings 74 and 76 from one another and project in each case with a free end into the openings 74 and 76. A further contact pin 87 moreover projects into the opening 74. It should additionally be mentioned that the extension 78 is also provided with a sealing element, by means of which it may be inserted sealingly into the opening 76. One of the two contact pins 82 and 84 serves as a common earth both for the position sensor 62 and for the line 44 to the actuator of the control valve 38. The further contact pin 87 is used for the power supply and control of the control valve 38.

FIG. 3 shows that with the configuration according to the invention a contacting both of the position sensor 62 and of the control valve 38 may be effected by means of only one central plug-in connector, which may be introduced into the opening 74 of the extension 72 and has corresponding contact elements for receiving the contact pins 82, 84 and 87.

Figure 4:
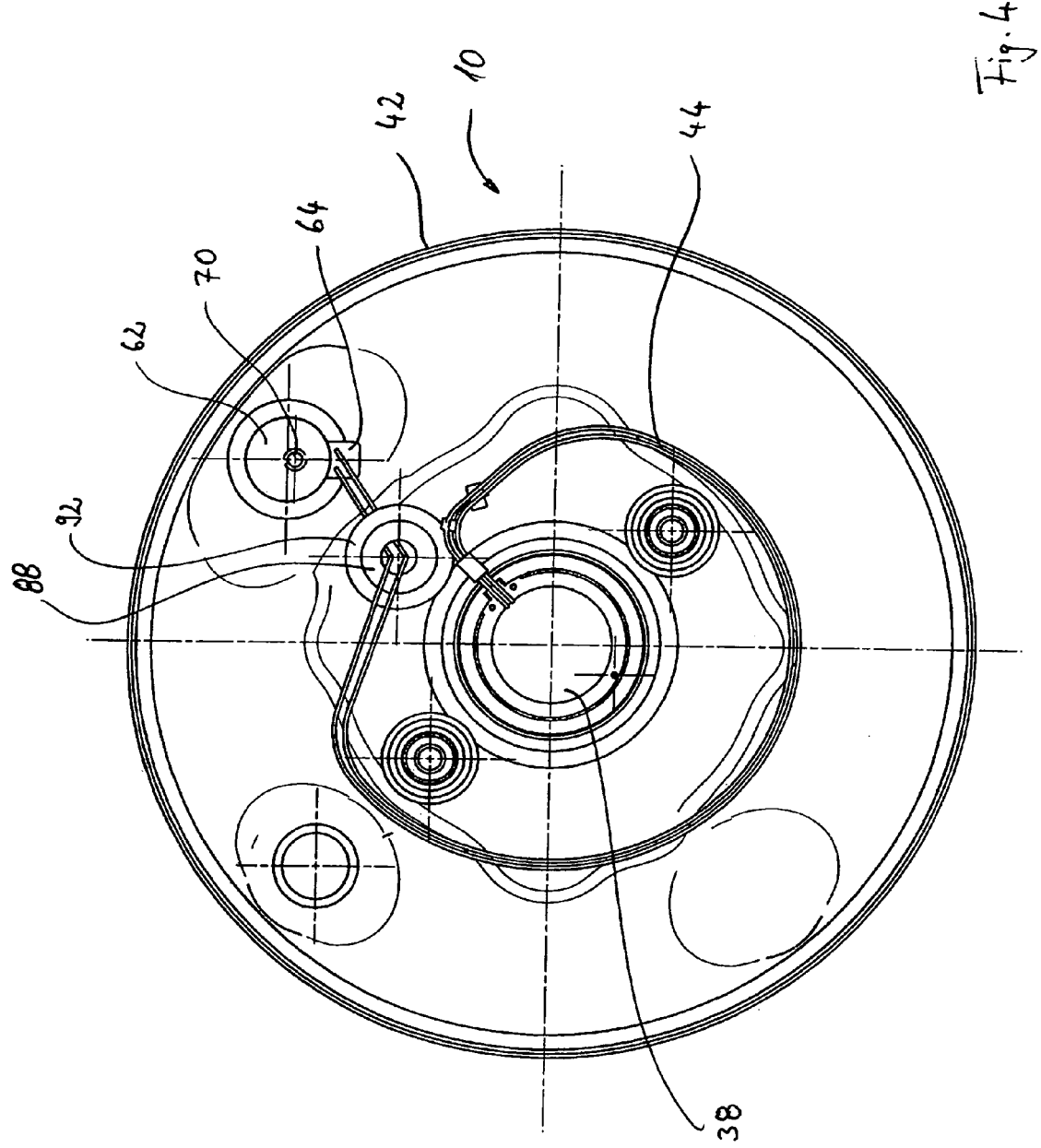
FIG. 4 a view along the cutting line IV-IV, wherein sectioned parts of the chamber arrangement and of the movable wall have been omitted.

FIG. 4 shows, in addition thereto, the course of the lines inside the chamber arrangement. As is evident from FIGS. 2 and 4, the lines 44 are disposed with considerable motional clearance inside the chamber arrangement 34. They extend from the position sensor 62 initially through a guide tube 88, which extends through the vacuum chamber 54 and the working chamber 56. In said case, the movable wall 58 that is displaced relative to the guide tube 88 is provided with a sliding seal 90 to allow the movable wall 58 to slide in a sealed manner along the guide tube 88 and at the same time prevent an exchange of gas through the bore provided in the movable wall 58. The rigid wall 52 is moreover provided with a sealing element 92, thereby likewise preventing an exchange of gas between the working chamber 56 and the vacuum chamber 48. The sealing element 92 is held in position by means of a flange on the end of the guide tube 88.

In the vacuum chamber 48 the lines 44 run—as already indicated above—with considerable motional clearance in a helical manner to allow them to compensate a movement of the control valve relative to the base housing 42.

Figure 5:
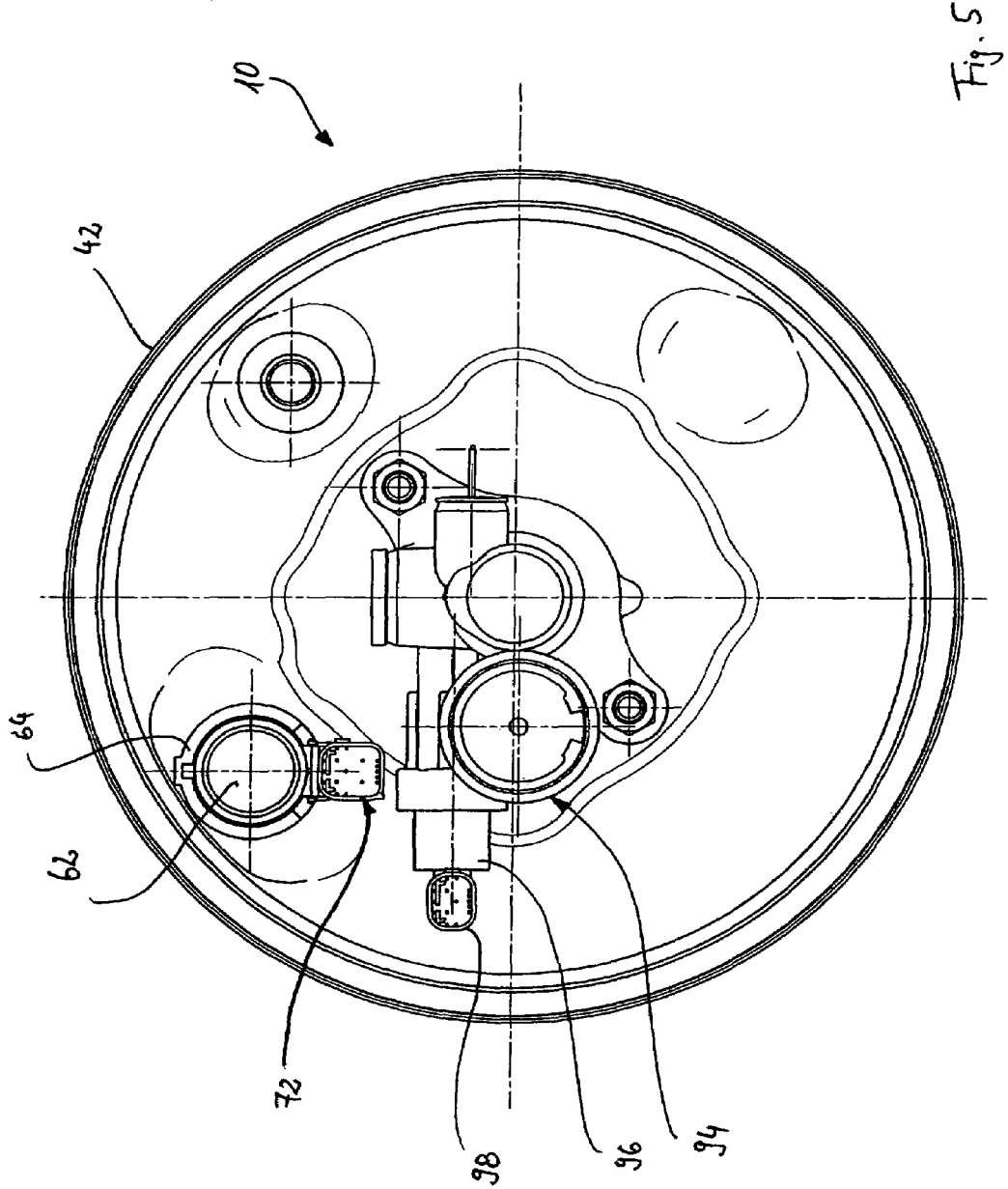
FIG. 5 a view in the direction according to arrow V of FIG. 2.

FIG. 5 shows the brake force generator 10 of FIG. 2 in a view in the direction according to arrow V. There, it is possible to see first of all at the top left the position sensor 62, as it is accommodated in the retaining element 64 inside the base housing 42. It is moreover possible to see the extension 72 in its configuration as a plug socket. Also shown in FIG. 5 is a pedal counterforce simulating device 94. The pedal counterforce simulating device 94 is designed in such a way that it is connectable hydraulically to the brake pedal in order to set against an actuation by the driver a pedal counterforce that is familiar to him via the force input element 32, even when the brake force generator 10 is operating in such a way that a brake pressure generation inside the cylinder housing 36 by means of the primary piston is effected exclusively by means of the control valve 38 without mechanical utilization of the pedal actuating force exerted via the force input element 32. The pedal counterforce simulating device is provided with a block valve 96, by means of which the hydraulic coupling to or uncoupling from the brake pedal may occur. Given uncoupling from the brake pedal, the pedal counterforce simulating device remains substantially inactive. The pedal counterforce simulating device 94 may moreover also be provided with various measuring sensors for acquiring the hydraulic pressure or other operating variables. For controlling the block valve 96 and for picking up the signals from the sensor equipment thereof, a further plug socket 98 is provided, which is formed in immediate spatial proximity to the extension 72 designed as a plug socket.

Figure 6:
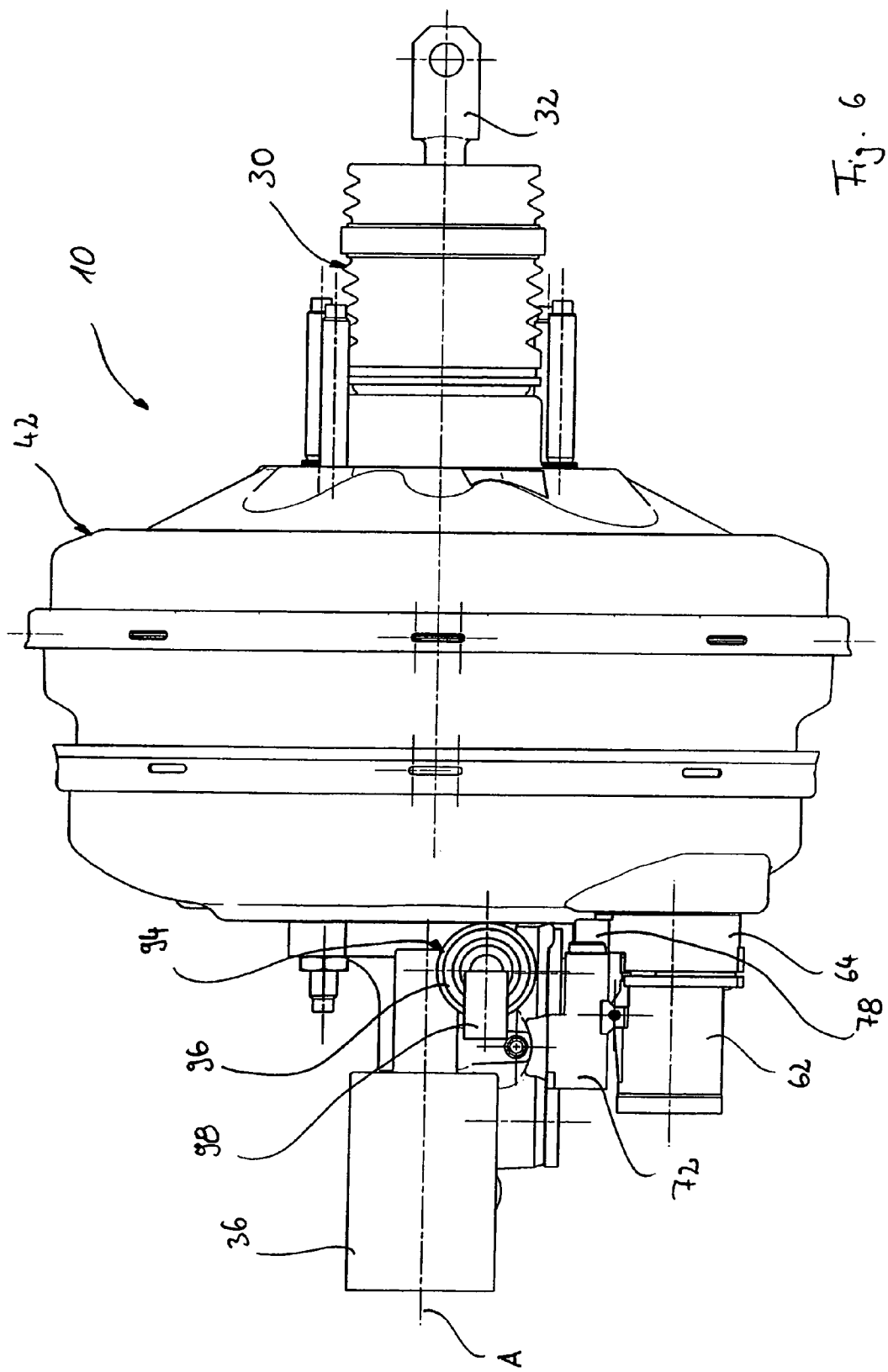
FIG. 6 a view as in FIG. 2, but with the brake force generator rotated through 90°.

FIG. 6 shows the arrangement in a view as in FIG. 2, but rotated through 90° in the direction of the drawing plane so that the spatial proximity, in which the two plug sockets 72 and 98 are disposed, becomes clear.

The representations of FIGS. 7 and 8 correspond to the representations of FIGS. 5 and 6. However, in these representations in each case the electronic control unit 18 is fitted on the brake force generator 10 in such a way that it engages with corresponding plug connectors (not visible in FIGS. 7 and 8) into the plug sockets 72 and 98 and is therefore connected in an electrically conductive manner to the corresponding contact elements. Thus, the control unit 18 receives all of the necessary signals from the position sensor 62 as well as from further sensors and is able to control the control valve 38 accordingly. The control unit 18 has a plug socket 100, which is designed with corresponding contact pins 102. A plug connector may be plugged into the plug socket 100 in order to connect the electronic control unit 18 to the vehicle electronics for signal transfer and power supply purposes.

There now follows a brief discussion of the mode of operation of the brake force generator according to the invention with reference to FIG. 2.

Following an actuation of the brake pedal, the force input element 32 is loaded with the force F and displaced along the longitudinal axis A of the brake force generator. The brake pedal actuation is detected directly by the angle-of-rotation sensor 14 shown in FIG. 1 and communicated to the electronic control unit 18. It activates the actuator and energizes it in accordance with defined characteristic curves and optionally with due regard to further parameters, for example of the stability program 24, the antilock braking system 26 or the distance monitoring device 28. As a result of the energizing of the actuator, the control valve 38 is set to a state, in which the first vacuum chamber 48 is isolated from the first working chamber 50 and the second vacuum chamber 54 is isolated from the second working chamber 56 and the working chambers 50 and 56 are connected to the ambient atmosphere. A pressure above atmospheric builds up in the working chambers 50 and 56 and leads to a displacement of the primary piston. In the primary pressure chamber formed in the cylinder housing 36 a brake pressure therefore builds up and is used in a vehicle brake system connected to the brake force generator 10 to brake the vehicle. The two movable walls 46 and 58 move far enough for the control valve 38 to close again. In this state, the system is in equilibrium and, in the absence of external influence, no further change occurs.

Upon release of the brake pedal by the driver, the system moves back into the position shown in FIG. 2. The force input element 32 is in said case returned to its basic position owing to the action of the pedal counterforce simulating device 94 and further resetting springs. This resetting movement however occurs with a hysteresis.

During the activation of the actuator, the electronic control unit 18 by means of the position sensor 62 permanently detects the actual position of the second movable wall 58 and of the first movable wall 46 connected thereto. Thus, the actual position of the control valve housing 40 may be acquired and compared with a setpoint position defined by the pedal actuation. Given a deviation of actual position and setpoint position, for example because of a variation of the pedal position by the driver or because of other external influences, the electronic control unit 18 activates the actuator in a corrective manner. For a detailed description of the function of the brake force generator 10, reference is made to the description of the patent application having the official file number DE 10 2004 005 107.

The invention reveals a way in which the design of a brake force generator may be markedly simplified in terms of inclusion into the electronic infrastructure of a vehicle. The brake force generator 10 according to the invention has only one plug socket 100, by which it may be connected to the vehicle electronics, in particular to an on-board computer and a central arithmetic unit. By virtue of the arrangement and cabling according to the invention of the brake force generator 10 it is no longer necessary, as in the background art, to provide terminals and plug-in connectors at a large number of different points of the brake force generator. As a result, the construction, assembly and susceptibility to faults of the brake force generator are markedly improved.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Brake force generator for a vehicle hydraulic brake system having
   a force input element, which is connectable to a brake pedal and displaceable in a base housing of the brake force generator, a master cylinder, in which a primary piston is displaceably guided, wherein the primary piston with the master cylinder delimits a primary pressure chamber for generating a hydraulic brake pressure, an electromagnetic actuating force generating device for exerting an actuating force on the primary piston and at least one operating position detecting device for detecting the present operating position of the brake force generator, wherein the actuating force generating device is controllable in accordance with a brake pedal actuation, a central connector, in which contact elements for contacting electric lines to the actuating force generating device and to the operating position detecting device are integrally provided; and an electronic control device, which controls the actuating force generating device in accordance with an output signal of the operating position detecting device, wherein the electronic control device is mechanically fitted directly on, and electrically connected to, the central connector.

2. Brake force generator according to claim 1, wherein the brake force generator comprises a control valve, a chamber arrangement and an electromagnetic actuator, wherein the chamber arrangement is designed with a vacuum chamber and a working chamber, which is separated from the vacuum chamber by a movable wall and fluidically connectable to the vacuum chamber by the control valve, and wherein the operating position detecting device is designed to detect the present position of the movable wall.

3. Brake force generator according to claim 2, wherein the chamber arrangement is designed as a tandem chamber arrangement comprising a first chamber arrangement and a second chamber arrangement separated from the first, wherein the first chamber arrangement comprises a first vacuum chamber and a first working chamber separated from the first vacuum chamber by a first movable wall, wherein moreover the second chamber arrangement comprises a second vacuum chamber and a second working chamber separated from the second vacuum chamber by a second movable wall, wherein the first and second chamber arrangement may be pressurized by means of the control valve.

4. Brake force generator according to claim 2, wherein the electric lines from the actuator to the central connector are run through a guide element in particular a guide tube, which penetrates at least one part of the chamber arrangement.

5. Brake force generator according to claim 3, wherein the electric lines from the actuator to the central connector extend one of spirally and helically at least in one part of the chamber arrangement.

6. Brake force generator according to claim 2, wherein the operating position detecting device is in the form of a position sensor.

7. Brake force generator according to claim 1, further including a pedal actuation detecting device for detecting an actual deflection of the brake pedal.

8. Brake force generator according to claim 7, wherein electrical contact elements for contacting electric lines to the pedal actuation detecting device are integrated in the central connector or in an auxiliary connector disposed in spatial proximity to the central connector.

9. Brake force generator according to claim 7, wherein the pedal actuation detection device is an angle-of-rotation sensor disposed at an axis of rotation of the brake pedal.

10. Brake force generator according to claim 1, characterized by a pedal counterforce simulating device, which is connectable to the force input element.

11. Brake force generator according to claim 10, wherein the pedal counterforce simulating device is designed with a pedal counterforce hydraulic system, wherein the pedal counterforce hydraulic system is provided with an electrically controllable block valve, which in a first position, preferably its passive position, uncouples the pedal counterforce hydraulic system and the force input element hydraulically from one another and allows a substantially undamped movement of the force input element and which in a second position, preferably its active position, connects the pedal counterforce hydraulic system and the force input element hydraulically to one another.

12. Brake force generator according to claim 11, wherein electrical contact elements for contacting electric lines to the block valve are integrated in the central connector or in an auxiliary connector disposed in spatial proximity to the central connector.

13. Brake force generator according to claim 11, further including an electronic control device, which controls the actuating force generating device in accordance with an output signal of the operating position detecting device, and wherein the electronic control device is electrically connected to the block valve.

14. Brake force generator, according to claim 1, wherein the electronic control device is electrically connected to a pedal actuation detecting device for detecting an actual deflection of the brake pedal.

15. Brake force generator according to claim 1, wherein the central connector is constructed integrally with the operating position detecting device.

16. Brake force generator according to claim 1, wherein the central connector is connectable to a terminal connector for contacting electric lines to the actuating force generating device.

17. Brake force generator according to claim 16, wherein the terminal connector is constructed integrally with a receiving element, wherein the receiving element fastens the operating position detecting device to the base housing.

18. Brake force generator according to claim 1, wherein the central connector is fastenable to the base housing.

19. Brake force generator according to claim 18, wherein the central connector and an auxiliary connector are fastenable to base housing.

20. Brake system for a motor vehicle having a brake force generator according to claim 1.

21. Brake force generator according to claim 1, wherein the electronic control device is mechanically fitted directly on, and electrically connected to, the central connector and at least one auxiliary connector.

* * * * *